United States Patent
Bontu et al.

(10) Patent No.: US 6,418,137 B1
(45) Date of Patent: Jul. 9, 2002

(54) TRANSMITTED SIGNAL POWER CONTROL IN CELLULAR COMMUNICATIONS SYSTEMS

(75) Inventors: Chandra Sekhar Bontu; Shavantha Kularatna; N. Gamini Senarath; Karl D. Mann, all of Nepean (CA); Peter Anthony Barany, McKinney, TX (US)

(73) Assignee: Nortel Networks Limited, St. Laurent ( * ) Notice: Subject to any disclaimer, the term of this patent is extended or adjusted under 35 U.S.C. 154(b) by 0 days.

(21) Appl. No.: 09/210,364

(22) Filed: Dec. 14, 1998

(51) Int. Cl.[7] .............................. H04B 7/212; H04Q 7/00
(52) U.S. Cl. ............................... 370/347; 370/332
(58) Field of Search .............................. 370/318, 321, 370/332, 333, 337, 347

(56) References Cited

U.S. PATENT DOCUMENTS

| | | | |
|---|---|---|---|
| 5,056,109 A | * 10/1991 | Gilhousen et al. | ............. 375/1 |
| 5,333,175 A | * 7/1994 | Ariyavisitakul et al. | ....... 379/58 |
| 5,461,639 A | 10/1995 | Wheatley, III et al. | ..... 375/205 |
| 5,603,096 A | * 2/1997 | Gilhousen et al. | ............. 455/69 |
| 5,768,684 A | 6/1998 | Grubb et al. | ............... 455/13.4 |
| 5,790,940 A | * 8/1998 | Laborde et al. | ................ 455/69 |
| 5,812,938 A | * 9/1998 | Gilhousen et al. | ............. 455/69 |
| 5,982,760 A | * 11/1999 | Chen | ........................... 370/335 |
| 6,075,974 A | * 6/2000 | Saints et al. | .................... 455/69 |
| 6,084,904 A | * 7/2000 | Wang et al. | ................. 375/130 |

* cited by examiner

Primary Examiner—Alpus H. Hsu
Assistant Examiner—Toan Nguyen
(74) Attorney, Agent, or Firm—Dennis R. Haszko; Smart & Biggar

(57) ABSTRACT

A base station produces a power control bit dependent on SNR (signal-to-noise ratio) determined for each time slot of a signal received from a remote station of a cellular communications system. If the SNR exceeds an upper threshold by an upper threshold margin, the power control bit is a binary 0 and the upper threshold margin is increased; if the SNR is below a lower threshold by a lower threshold margin, the power control bit is a binary 1 and the lower threshold margin is increased; and otherwise the power control bit alternates its binary value for successive time slots and setting the threshold margins are reset. In the remote station, the power control bits are accumulated by a bidirectional counter and the transmitted signal power is only changed up or down in response to the count exceeding a respective threshold. The process can also or instead be used for the opposite transmission direction, and provides fast power control using a single bit per time slot in a manner that is tolerant of errors in the transmitted power control bits.

13 Claims, 2 Drawing Sheets

TRANSMITTED SIGNAL POWER CONTROL IN CELLULAR COMMUNICATIONS SYSTEMS

This invention relates to the control of the power of transmitted signals in cellular communications systems, such as cellular radio communications systems using TDMA (time division multiple access) or CDMA (code division multiple access) techniques. One example of a TDMA system is referred to as an IS-136+ system.

BACKGROUND OF THE INVENTION

In a cellular radio communications system, communications take place between base stations in respective cells and remote, typically mobile, stations using spectrum sharing techniques such as TDMA, CDMA, and FDMA (frequency division multiple access). In order to enhance the operation of such systems, for example in order to limit power consumption, minimize interference among different users and/or cells, and maximize the system capacity in terms of numbers of users, it is known to limit the powers of signals transmitted by the base and remote stations to only the levels necessary at any time for effective communications. Accordingly, closed loop transmitted signal power control is known in such systems.

For example, Gilhousen et al. U.S. Pat. No. 5,812,938 issued Sep. 22, 1998 entitled "Reverse Link, Closed Loop Power Control In A Code Division Multiple Access System" discloses a power control process in a CDMA system in which a base station measures SNR (signal-to-noise ratio) of a signal received from a mobile station and, in dependence upon this SNR relative to threshold values, generates power control commands to instruct the mobile station to change its transmitted signal power. Each power control command comprises two bits indicating a power "turn up" or "turn down" command. If both bits indicate a "turn down" command, the mobile station decreases its transmitted signal power by 1 dB. If the first bit is a "turn down" command and the second bit is a "turn up" command (referred to as a "down-up" command), the mobile station does not change its transmitted signal power. If the first bit is a "turn up" command, the mobile station can increase its transmitted signal power by 1 dB depending upon the second bit.

While such a system enables the remote (mobile) station transmitted signal power to be increased, decreased, or unchanged for each power control command, each such command requires two bits. In an IS-136+ TDMA system referred to above, only a single bit for each time slot is allocated for fast power control purposes. In general, it is desirable to reduce the average number of bits per time slot or time period which are used for power control, while providing a process that enables fast power control for responding to rapid signal changes, for example Raleigh fading.

It is also known in a CDMA system to use a single bit for each fast power control command, this being for example a binary one to command the remote station to increase the transmitted signal power by for example 0.5 dB, and a binary zero to command the remote station to decrease the transmitted signal power by 0.5 dB. In this case successive power control commands can alternate between one and zero to maintain a transmitted signal power that is relatively constant, i.e. that changes up and down by only 0.5 dB.

While such a power control process may be acceptable in a CDMA system in which the remote station transmitted signal power can be changed in relatively small steps, it is impractical in a TDMA system in which the transmitted signal power can only be adjusted in large steps, for example of 4 dB or 2 dB for TDMA mobile terminals. Applying alternating power increase and power decrease commands to such a remote station adversely affects operation of the power amplifier of the transmitter and the transmitted signal spectrum, and additionally results in an excessive requirement for processing of power command signals. In addition, such a system is prone to errors; whereas in a CDMA system there is an outer power control loop that enables the effects of power command errors to be minimized, this is not the case in the TDMA system. Even in a CDMA system, it may be desirable to reduce the average rate at which power control bits are communicated.

Accordingly, there is a need for an improved fast power control process which for example can be used in a TDMA system using only one bit per time slot and which avoids these disadvantages.

An object of this invention, therefore, is to facilitate provision of such a fast power control process.

SUMMARY OF THE INVENTION

One aspect of this invention provides a method of producing power control bits at a first station for use in controlling power of a signal transmitted by a second station and received at the first station, comprising the steps of: determining a signal quality parameter of the signal received at the first station; in response to the determined signal quality parameter exceeding an upper threshold by an upper threshold margin, producing a power control bit with a first binary value and increasing the upper threshold margin; in response to the determined signal quality parameter being below a lower threshold by a lower threshold margin, producing a power control bit with a second binary value and increasing the lower threshold margin; and in response to the determined signal quality parameter not exceeding the upper threshold by the upper threshold margin and not being below the lower threshold by the lower threshold margin, producing a power control bit with a binary value opposite to the binary value of the preceding power control bit and setting the upper and lower threshold margins to predetermined values.

Conveniently the lower threshold margin is also set to its predetermined value in response to the determined signal quality parameter exceeding the upper threshold by the upper threshold margin, and the upper threshold margin is also set to its predetermined value in response to the determined signal quality parameter being below the lower threshold by the lower threshold margin.

The signal quality parameter preferably comprises signal-to-noise ratio of the signal received at the first station. Each increase in the upper and the lower threshold margin is preferably by an amount substantially equal to a predetermined power change step size, e.g. 4 dB, of the signal transmitted by the second station divided by an integer N greater than one. The integer N is preferably from 3 to 7, for example N=5.

Preferably the signal received at the first station is a signal received in a time slot of a time division multiplexed communications system, and the signal quality parameter of the signal is determined for each time slot of the received signal. The method preferably includes the step of transmitting a further signal from the first station, for reception by the second station, in time slots of a time division multiplexed communications system, one bit of the further signal in each time slot being constituted by the power control bit.

Another aspect of the invention provides a method of controlling, in response to power control bits produced at a first station by the method recited above, power of a signal transmitted by the second station for reception by the first station, comprising the steps of: in response to successive ones of the power control bits, producing a variable which is incremented in a first direction in response to each power control bit having the first binary value and in a second, opposite, direction in response to each power control bit having the second binary value; in response to the variable being incremented in the first direction to exceed a first threshold, decreasing the power of the signal transmitted by the second station by a predetermined power change step size and changing the variable in the second direction; and in response to the variable being incremented in the second direction to exceed a second threshold, increasing the power of the signal transmitted by the second station by the predetermined power change step size and changing the variable in the first direction.

For example, the variable can comprise a count of a counter. This method preferably includes the step of receiving each power control bit in a respective time slot of a time division multiplexed further signal transmitted by the first station.

A further aspect of this invention provides a method of controlling power of a signal transmitted between a remote station and a base station of a cellular radio communications system, comprising the steps of producing power control bits at one of said stations, and controlling power of a signal transmitted by the other of said stations, by the methods recited above.

Typically said one of said stations can be the base station and said other of said stations can be the remote station. This method can further comprise the steps of producing power control bits at said other of said stations, and controlling power of a signal transmitted by said one of said stations, by the methods recited above.

A further aspect of this invention provides a station for a cellular radio communications system, comprising a transceiver and a control unit arranged for operation in accordance with a method recited above.

BRIEF DESCRIPTION OF THE DRAWINGS

The invention will be further understood from the following description with reference to the accompanying drawings, in which.

DETAILED DESCRIPTION

Figure 1:
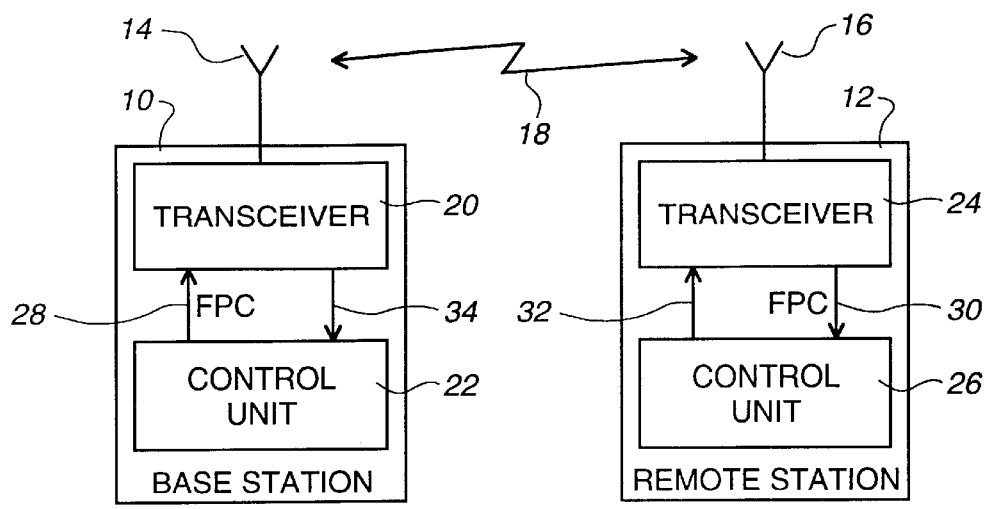
FIG. 1 schematically illustrates a base station and a remote station of a cellular radio communications system to which an embodiment of the invention is applied.

Referring to FIG. 1, a base station 10 and a remote station, for example a mobile terminal, 12 of a TDMA cellular radio communications system, in this embodiment of the invention for example being an IS-136+ system, are schematically illustrated as being in bidirectional wireless communications with one another via respective antennas 14 and 16 and a wireless link 18. Details of the stations 10 and 12 and of the communications system are known in the art and are not described here except to the extent that they relate directly to this embodiment of the invention. As is known in the art, the base station 10 includes a radio transceiver (transmitter and receiver) 20 and a control unit 22. Likewise, the remote station 12 includes a transceiver 24 and a control unit 26.

Wireless communications in each direction on the link 18 between the base station 10 and the remote station 12 take place in time slots with one bit in each time slot allocated for fast power control (FPC) and referred to as an FPC bit. As illustrated in FIG. 1, for fast control of the transmitted signal power of the remote station 12, the control unit 22 in the base station 10 produces, in a manner described in detail below, an FPC bit for each time slot of the communications from the base station 10 to the remote station 12 and supplies this FPC bit via a line 28 to the transceiver 20 to be transmitted to the remote station 12. In the remote station 12, the FPC bit in each time slot is received by the transceiver 24 and is supplied via a line 30 to the control unit 26.

In the remote station 12 the control unit 26 controls the transmitted signal power of the transceiver 24 via a line 32 in dependence upon the received FPC bits in successive time slots. In the base station 10 the control unit 22 is supplied via a line 34 with signals from which the control unit 22 determines, in known manner, the SNR (signal-to-noise ratio) of the signal received from the remote station 12, and uses this as described below to determine the FPC bits in successive time slots. Consequently, there is a closed loop for control of the signal power transmitted by the remote station 12. Although the following description refers only to SNR for determining the FPC bits, it can be appreciated that other signal quality parameters, such as received signal level and/or monitored error rates, can instead or additionally be used in determining the FPC bits. In addition, the SNR that is used as the signal quality parameter is preferably the average SNR over each time slot of the received signal.

Figure 2:
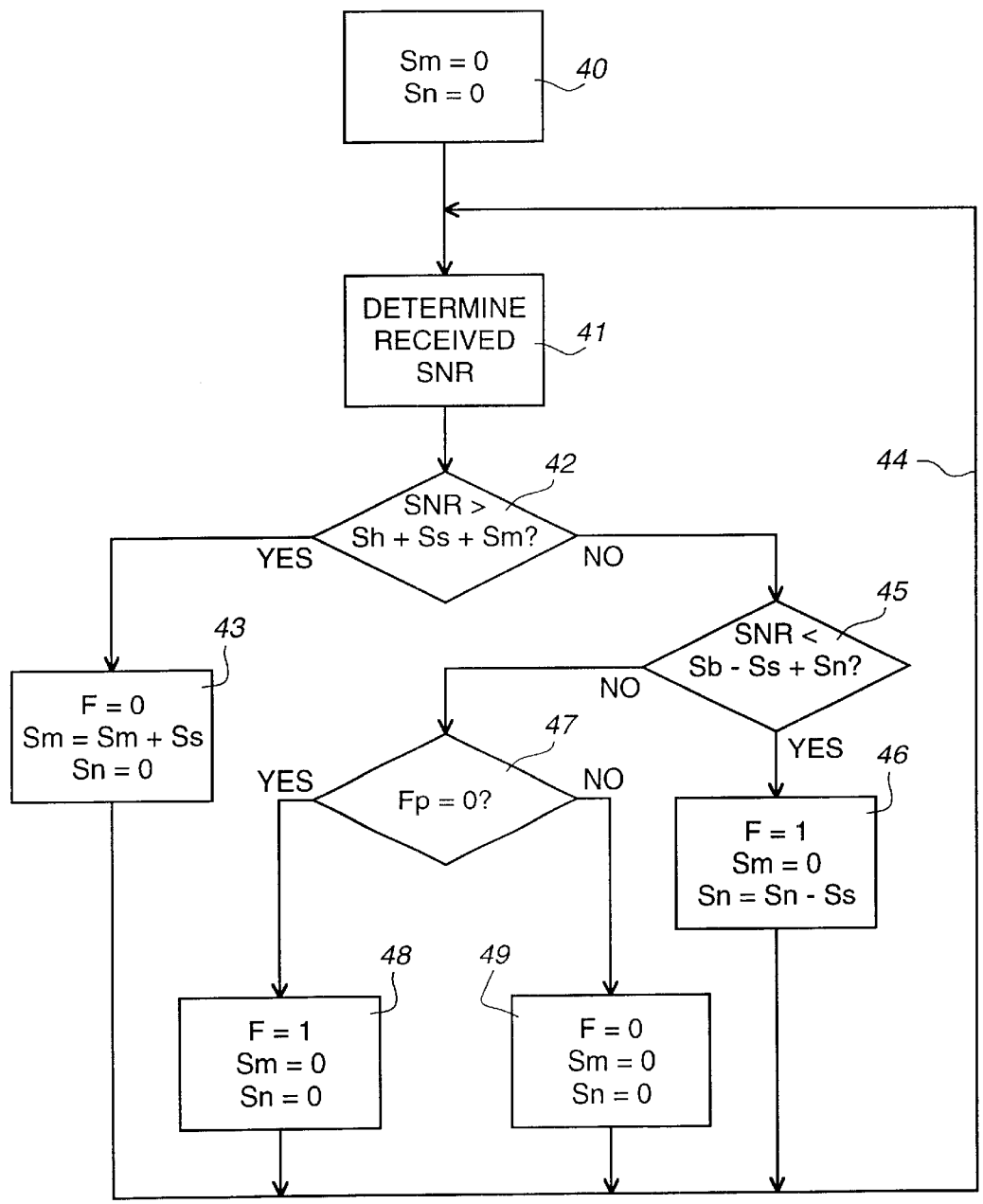
FIG. 2 is a flow chart of steps carried out in the base station in accordance with an embodiment of the invention.

The flow chart in FIG. 2 illustrates steps that are carried out by the control unit 22 in the base station 10 for producing the FPC bit for each time slot. In this flow chart and in the following description, Sh is an upper threshold and Sb is a lower threshold for the received signal SNR averaged over a time slot, which normally is desired to be between these thresholds. The thresholds can be predetermined levels or can be adaptively determined in accordance with desired operating characteristics of the communications system. For example a difference between these thresholds may be about 5 dB. In the event that the received SNR is greater than the upper threshold Sh, it is desirable to reduce the signal power transmitted by the remote station for example in order to conserve power and reduce interference with other signals in the communications system. In the event that the received SNR is less than the lower threshold, it is desirable to increase the signal power transmitted by the remote station for example in order to maintain a desired received signal quality.

Sm and Sn are margin parameters which are applied to threshold comparisons involving the upper and lower thresholds respectively. Ss is a threshold parameter which is determined by the equation Ss=Pinc/N, where Pinc is the power step size by which the transmitted signal power of the remote station can be changed up or down, and N is an integer which, for reasons discussed below related to outage probability, is preferably greater than one. Typically for remote stations in a TDMA system Pinc=4 dB. The integer N can be determined empirically or by simulation and is conveniently (but not necessarily) odd, and represents a minimum number of slots between successive power changes. Lower values of N involve a relatively high processing rate of power control commands, whereas higher values of N result in slower adjustment of the transmitted signal power. With Pinc=4 dB the value of N is conveniently in a range from about 3 to 7, with N=5 or N=7 being preferred. In the following description it is assumed for example that N=5 and that Pinc=4 dB, so that Ss=0.8 dB.

F represents the binary value of the FPC bit for a current time slot, and Fp represents the binary value of the FPC bit for the immediately preceding time slot for the same communications channel (i.e. transmitted to the same remote station 12).

The steps in the flow chart of FIG. 2 performed by the control unit 22 of the base station 10 are described below, the blocks of the flow chart being identified in parentheses in relation to the respective steps.

Initially the parameters Sm and Sn are set to zero (block 40). For a current time lot of its received signal, the control unit 22 determines (block 41) the received SNR averaged over the time slot and then determines (decision 42) whether or not this is greater than Sh+Ss+Sm. If it is, then the control unit determines (block 43) that the current FPC bit to be transmitted by the transceiver 20 should have the value F=0, indicating a potential decrease in transmitted signal power by the remote station, increases the parameter Sm by the amount Ss (i.e. Sm is changed to Sm+Ss), and sets the parameter Sn to zero. From the block 43, the control unit 22 returns via a path 44 to the block 41 for determining the received SNR for the next time slot of the signal received from the respective remote station 12.

If the control unit determines at the decision 42 that the received SNR is not greater than Sh+Ss+Sm, it then determines (decision 45) whether or not the received SNR is less than Sb−Ss+Sn. If it is, then the control unit determines (block 46) that the current FPC bit to be transmitted by the transceiver 20 should have the value F=1, indicating a potential increase in transmitted signal power by the remote station, sets the parameter Sm to zero, and decreases the parameter Sn by the amount Ss (i.e. Sn is changed to Sn−Ss, from which it can be seen that non-zero values of Sn are negative). From the block 46, the control unit 22 returns via the path 44 to the block 41.

If the control unit determines at the decision 45 that the received SNR is not less than Sb−Ss+Sn, it then determines (decision 47) whether or not the previous FPC bit Fp was zero. If so, then the control unit determines (block 48) that the current FPC bit to be transmitted by the transceiver 20 should have the value F=1, and if not, it determines (block 49) that the current FPC bit to be transmitted by the transceiver 20 should have the value F=0. In either case (blocks 48 and 49) it sets the parameters Sm and Sn to zero, and returns to the block 41 via the path 44.

Figure 3:
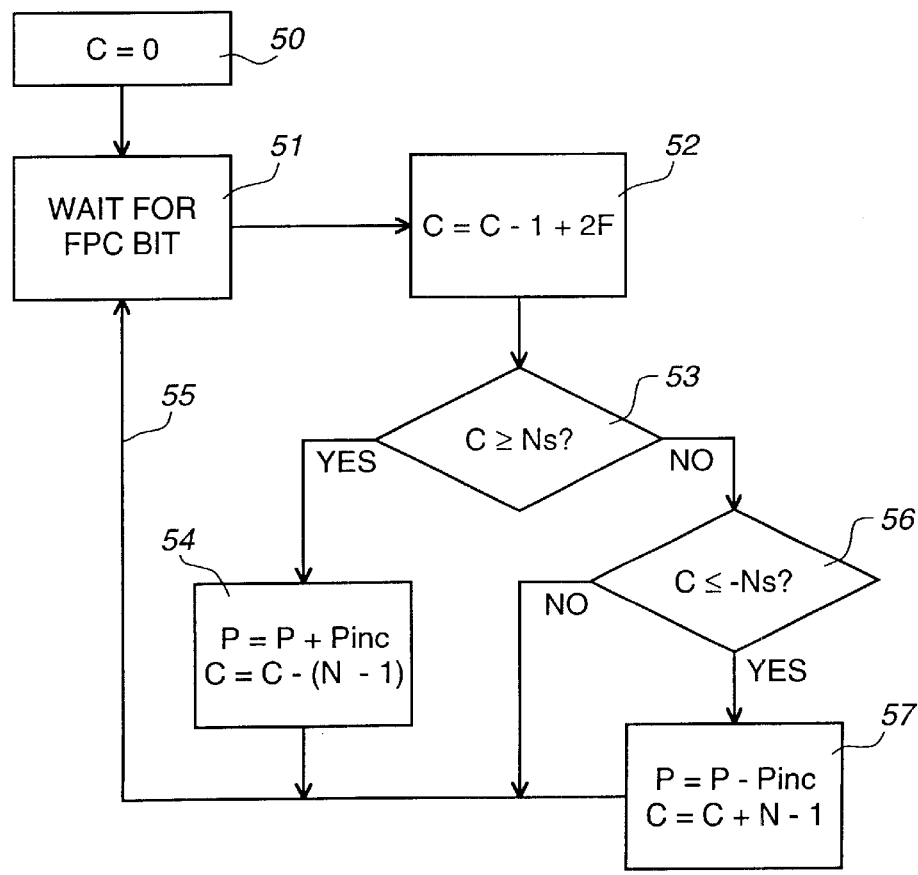
FIG. 3, which is on the same sheet as FIG. 1, is a flow chart of steps carried out in the remote station in accordance with an embodiment of the invention.

The flow chart in FIG. 3 illustrates steps that are carried out by the control unit 26 in the remote station 12 in response to the FPC bits received via the transceiver 24 and line 30 in the successive time slots. In this flow chart and in the following description, F is again the binary value of the respective FPC bit, C is an integer that can be zero, positive or negative and can conveniently be constituted by the count of an up-down counter and is described accordingly below, P represents the transmitted signal power to be used by the transceiver 24 in the remote station 12, Pinc and N are as described above, and Ns is a threshold which is determined as being the smallest integer equal to or greater than 1+N/2.

The steps in the flow chart of FIG. 3 performed by the control unit 24 of the remote station 12 are described below, the blocks of the flow chart being identified in parentheses in relation to the respective steps.

Initially the count C is set to zero (block 50), and there is a wait state (block 51) until receipt of the next FPC bit, having the binary value F. On receipt of this bit, the count C is increased by 1 if the bit F=1 and decreased by 1 if the bit F=0, or in other words the count C is replaced (block 52) by a count C−1+2F. The control unit 26 then determines (block 53) whether or not the count C is greater than or equal to Ns. If it is, then this indicates that the transmitted signal power should be increased, and accordingly the control unit 26 increases (block 54) by Pinc the transmitted signal power P to be used by the transceiver 24 of the remote station 12 and controls the transceiver accordingly via the line 32 as described above, and decreases the count C by N−1. From the block 54, the control unit 26 returns via a path 55 to the block 51 to wait for the next FPC bit in the next time slot of the signal received from the base station 10.

If the control unit 26 determines at the decision 53 that the count C is not greater than or equal to Ns, it then determines (decision 56) whether or not the count C is less than or equal to −Ns. If it is, then this indicates that the transmitted signal power should be decreased, and accordingly the control unit 26 decreases (block 57) by Pinc the transmitted signal power P to be used by the transceiver 24 of the remote station 12 and controls the transceiver accordingly via the line 32 as described above, and increases the count C by N−1. From the block 57, the control unit 26 returns via the path 55 to the wait state block 51. If it is determined in the decision 56 that the count C is not less than or equal to −Ns, then no change is made in either the transmitted signal power P or the count C, and the control unit 26 returns directly via the path 55 to the wait state block 51.

For the case of N=5 referred to above, it can be appreciated that Ns=4, so that a count C of 4 is needed for the block 54 to be reached, where the power P is increased and the count C is decreased by N−1=4 to give a new count of zero. Similarly, a count C of −4 is needed for the block 57 to be reached, where the power P is decreased and the count C is increased by N−1=4 to give a new count of zero.

It can be seen from a consideration of the operation of the control units 22 and 26 in accordance with the flow charts of FIGS. 2 and 3 that, when the SNR of the signal received by the base station 10 (which is dependent, among other things, on the signal power transmitted by the remote station 12) is substantially between the upper and lower thresholds Sh and Sb, the FPC bits alternate between binary one and zero values and the count C in the control unit 26 remains at or near zero. Consequently there are no changes in the transmitted signal power and no power change commands to be processed by the remote station 12.

With signal fading, shadowing, and other signal strength variations that are typical in a cellular radio communications system, there can be relatively rapid changes in the received SNR determined at the base station 10, and consequently the SNR can consistently be above the upper threshold Sh, as modified by the parameters Sm and Ss used in the decision 42, or below the lower threshold Sb, as modified by the parameters Sn and Ss used in the decision 45. In the former case, the successive FPC bits more frequently have a binary value of 0, resulting in the count C becoming increasingly negative until the block 57 is reached, the transmitted signal power then being decreased (resulting in the SNR being decreased) and the count C being changed in a positive direction. In the latter case, the successive FPC bits more frequently have a binary value of 1, resulting in the count C becoming increasingly positive until the block 54 is reached, the transmitted signal power then being increased (resulting in the SNR being increased) and the count C being changed in a negative direction.

Instead of being set to zero in the blocks 40, 46, 48, and 49 as described above, the parameter Sm can be set to the value of Ss, with the decision block 42 instead determining whether or not the received SNR is greater than Sh+Sm. Correspondingly, instead of being set to zero in the blocks 40, 43, 48, and 49 as described above, the parameter Sn can be set to the value −Ss, with the decision block 45 instead determining whether or not the received SNR is less than Sh+Sn. It can be seen that the magnitude of the margin parameter Sm or Sn is increased, in the block 43 or 46 respectively, when there is an affirmative result of the decision 42 or 45 respectively. This results in a changing comparison threshold, upwardly in the case of the upper threshold and downwardly in the case of the lower threshold, for the control unit 22 to repeat the same binary value F of the FPC bits in consecutive time slots. The changing comparison thresholds facilitate reliable and effective operation of the fast power control process, and contribute to providing a good immunity of the process to errors of the communicated FPC bits. Consequently, relatively high error rates of the FPC bits (for example 10% of the FPC bits in error) can be tolerated by the process without significantly adverse results.

As indicated above, the processing rate for power change commands using the embodiment of the invention described above is inversely dependent upon the value chosen for N. It is also dependent upon the value of Pinc (the processing rate being smaller for smaller values of Pinc, for example for Pinc=2 dB) and on factors such as the rate of change of SNR, and hence vehicle speed where the remote station is a mobile terminal in a vehicle (the processing rate being smaller for higher rates of change of SNR). By way of example, with one set of variables, simulations indicated an average number of power change commands per minute being 2570 for N=1, 639 for N=3, 439 for N=5, and 430 for N=7. This suggested an optimum value of N=5, with relatively little reduction in processing rate for power change commands beyond this value of N.

A significant indication of performance of the fast power control process is referred to as the outage probability, which is the probability of the SNR being less than a given value of SNR and can be plotted as a. graph of probability versus SNR. This probability is particularly significant for lower values of SNR (e.g. less than 20 dB). Compared to a situation without the FPC process described above, it can be determined that for such lower values of SNR the FPC process described above provides a decreased (improved) outage probability with values of N greater than one. For example, for an outage probability of 0.1 corresponding to an SNR of about 6.5 dB for a situation without of 5 dB) for the FPC process described above with values of N from 3 to 7. However, for the FPC process described above and with N=1, the SNR corresponding to the same outage probability of 0.1 can be reduced to about 1.5 dB. Especially for this reason, a value of N that is greater than 1 is desirable.

Generally, computer simulations indicate that, for an outage probability of 0.1 and a variety of operating conditions, in comparison to situations without the FPC process, the FPC process described above provides an improvement in SNR of the order of 3.5 to 5 dB with N=5, with a generally similar improvement for other values of N greater than one. Considered alternatively, it can be appreciated that, for a given SNR less than for example 20 dB, the FPC process described above, with a value of N greater than one, provides a substantially decreased outage probability.

Although the invention has been described above in terms of the base station 10 monitoring SNR of the signal received from the remote station 12 with the power of the signal transmitted by the remote station being controlled accordingly, it can be appreciated that the same process can be applied instead, or in addition, for control of the transmitted signal power for the opposite direction of transmission, i.e. with the remote station 12 monitoring SNR of the signal received from the base station 10 and with the power of the signal transmitted by the base station being controlled accordingly.

In addition, although the invention has been described above in relation to a TDMA system with the SNR averaged over each time slot, it can be appreciated that alternatively the SNR can be determined and/or averaged over other periods, and that the invention can also be applied to a CDMA system with determination and/or averaging of the SNR or other signal quality parameter over any desired period.

It can also be appreciated that the particular values given above for various parameters and binary values are provided only by way of example, and these may be changed to suit particular situations or requirements.

Thus although a particular embodiment of the invention has been described in detail, it should be appreciated that these and numerous other modifications, variations, and adaptations may be made without departing from the scope of the invention as defined in the claims.

What is claimed is:

1. A method of producing power control bits at a first station for use in controlling power of a signal transmitted by a second station and received at the first station, comprising the steps of:

determining a signal quality parameter of the signal received at the first station;

in response to the determined signal quality parameter exceeding an upper threshold by an upper threshold margin, producing a power control bit with a first binary value and increasing the upper threshold margin;

in response to the determined signal quality parameter being below a lower threshold by a lower threshold margin, producing a power control bit with a second binary value and increasing the lower threshold margin; and in response to the determined signal quality parameter not exceeding the upper threshold by the upper threshold margin and not being below the lower threshold by the lower threshold margin, producing a power control bit with a binary value opposite to the binary value of the preceding power control bit and setting the upper and lower threshold margins to predetermined values;

in response to successive ones of the power control bits, producing a variable which is incremented in a first direction in response to each power control bit having the first binary value and in a second, opposite, direction in response to each power control bit having the second binary value;

in response to the variable being incremented in the first direction to exceed a first threshold, decreasing the power of the signal transmitted by the second station by a predetermined power change step size and changing the variable in the second direction; and in response to the variable being incremented in the second direction to exceed a second threshold, increasing the power of the signal transmitted by the second station by a predetermined power change step size and changing the variable in the direction.

2. A method as claimed in claim 1 wherein the variable comprises a count of a counter.

3. A method as claimed in claim 1 and including the step of receiving each power control bit in a respective time slot of a time division multiplexed further signal transmitted by the first station.

4. A station for a cellular radio communications system, comprising a transceiver and a control unit arranged for operation in accordance with the method of claim 1.

5. A method of producing power control bits at a first station for use in controlling power of a signal transmitted by a second station and received at the first station, comprising the steps of:

determining a signal quality parameter of the signal received at the first station;

in response to the determined signal quality parameter exceeding an upper threshold by an upper threshold margin, producing a power control bit with a first binary value and increasing the upper threshold margin;

in response to the determined signal quality parameter being below a lower threshold by a lower threshold margin, producing a power control bit with a second binary value and increasing the lower threshold margin; and in response to the determined signal quality parameter not exceeding the upper threshold by the upper threshold margin and not being below the lower threshold by the lower threshold margin, producing a power control bit with a binary value opposite to the binary value of the preceding power control bit and setting the upper and lower threshold margins to predetermined values;

wherein each increase in the upper and the lower threshold margins is by an amount substantially equal to a predetermined power change step size of the signal transmitted by the second station divided by an integer N greater than one.

6. A method as claimed in claim 5 wherein the integer N is from 3 to 7.

7. A method as claimed in claim 5 wherein the signal quality parameter comprises signal-to-noise ratio of the signal received at the first station.

8. A method as claimed in claim 5 wherein the predetermined power change step size is substantially 4 dB.

9. A method as claimed in claim 5 and including the step of transmitting a further signal from the first station, for reception by the second station, in time slots of a time division multiplexed communications system, one bit of the further signal in each time slot being constituted by the power control bit.

10. A method as claimed in claim 9 wherein the signal quality parameter comprises signal-to-noise ratio of the signal received at the first station.

11. A method of controlling power of a signal transmitted between a remote station and a base station of a cellular radio communications system, comprising the steps of producing power control bits at one of said stations by the method of claim 1 and controlling power of a signal transmitted by the other of said stations by the steps of:

in response to successive ones of the power control bits, producing a variable which is incremented in a first direction in response to each power control bit having the first binary value and in a second, opposite, direction in response to each power control bit having the second binary value;

in response to the variable being incremented in the first direction to exceed a first threshold, decreasing the power of the signal transmitted by said other of said stations by a predetermined power change step size and changing the variable in the second direction; and in response to the variable being incremented in the second direction to exceed a second threshold, increasing the power of the signal transmitted by said other of said stations by the predetermined power change step size and changing the variable in the first direction.

12. A method as claimed in claim 11 wherein said one of said stations is the base station and said other of said stations is the remote station.

13. A method as claimed in claim 11 wherein said one of said stations is the remote station and said other of said stations is the base station.

* * * * *